(12) United States Patent
Carau, Sr.

(10) Patent No.: US 6,539,117 B2
(45) Date of Patent: *Mar. 25, 2003

(54) SYSTEM AND METHOD FOR RENDERING IMAGE BASED DATA

(75) Inventor: Frank P Carau, Sr., Loveland, CO (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,047

(22) Filed: Apr. 12, 1999

(65) Prior Publication Data

US 2001/0031087 A1 Oct. 18, 2001

(51) Int. Cl.⁷ .................................................. G06K 9/72
(52) U.S. Cl. ....................... 382/229; 358/462; 382/177; 382/309; 707/516; 707/519; 707/521; 707/541
(58) Field of Search ................................ 382/172–177, 382/198; 358/1.18, 462; 707/513–516, 521, 1, 4, 540, 541

(56) References Cited

U.S. PATENT DOCUMENTS

| | | | |
|---|---|---|---|
| 5,179,599 A | 1/1993 | Formanek | 382/51 |
| 5,212,739 A | 5/1993 | Johnson | 382/9 |
| 5,237,627 A | 8/1993 | Johnson et al. | 382/30 |
| 5,280,367 A | 1/1994 | Zuniga | 358/462 |
| 5,546,474 A | 8/1996 | Zuniga | 382/176 |
| 5,548,700 A * | 8/1996 | Bagley et al. | 707/540 |
| 5,553,205 A | 9/1996 | Murray | 395/117 |
| 5,596,655 A | 1/1997 | Lopez | 382/173 |
| 5,613,019 A * | 3/1997 | Altman et al. | 382/311 |
| 5,634,094 A * | 5/1997 | Ueda | 707/521 |
| 5,734,761 A * | 3/1998 | Bagley | 382/309 |
| 5,787,418 A * | 7/1998 | Hibbetts et al. | 707/4 |
| 5,897,644 A * | 4/1999 | Nielsen | 707/513 |
| 5,953,735 A * | 9/1999 | Forcier | 707/541 |
| 6,029,171 A * | 2/2000 | Smiga et al. | 707/102 |

* cited by examiner

Primary Examiner—Bhavesh Mehta
Assistant Examiner—Gregory Desire

(57) ABSTRACT

A communications system for rendering image based data includes a data interface, a display device, and a data manager. The data interface receives image based data that is used by the display device to display an image. The data manager identifies word blocks defined by the received data. The data manager uses the word blocks to define a first row of the image. In this regard, the data manager determines whether images respectively defined by each of the word blocks would be visible if the word blocks are rendered to the first row of the display screen. In response to a determination that an image associated with one of the word blocks would not be visible if the one word block is rendered to the first row of the display screen, the data manager defines a second row and renders the one word block to the second row.

18 Claims, 5 Drawing Sheets

SYSTEM AND METHOD FOR RENDERING IMAGE BASED DATA

BACKGROUND OF THE INVENTION

1. Field of the Invention

The present invention generally relates to data processing and, in particular, to a system and method for rendering image based data via a display screen such that each word of a row of text is simultaneously visible.

2. Related Art

It is often desirable for a user to be able to communicate information from various locations. Therefore, portable communications devices have been developed that allow a user to transmit and receive information when the user is at a plurality of possible locations. For example, a user traveling to different cities or other locations can utilize a portable communications device to establish communication with remote communications devices and/or networks.

Most portable communications devices include a data interface that interfaces data between the portable communications device and outside systems or devices. As an example the data interface can be connected to and receive data from a telephone line. The data received by the data interface can then be displayed to the user via a display screen associated with the portable communications device.

To facilitate transportation, most display screens associated with portable communication is devices are relatively small. In fact, many of these display screens are not large enough to display a complete line of text that has been transmitted to the communication is device. Therefore, when the text is defined by ASCII code words, most portable communications devices are designed to insert a line break after the last word in the line that can be displayed on a single row of the display screen. Then, the remainder of the words in the line are displayed on the next row of the display screen. Therefore, a single line of text is displayed on multiple row(s) of the display screen, and the user is able to view each word of the line simultaneously. This process of automatically breaking a line of text to enable simultaneous viewing of each word in the line is commonly referred to as "word wrapping."

However, the data transmitted to the portable communications device is not always defined by ASCII code words. For example, in many situations, image based data (such as facsimile data, for example) is transmitted to the portable communications device. Image based data does not include ASCII code words but instead includes data strings that are associated with each pixel of the image defined by the image based data. The data strings define the color or shade of the pixels of the image.

Since the text of image based data is not defined by ASCII code words, it is difficult for most portable communications devices to identify the words of the text. Therefore, most portable communications devices render image based data without attempting to divide or break lines of text that do not fit on a single row of the display screen. Furthermore, since the display screen is not usually large enough to display a complete line of text, most of the lines of text are not completely displayed to the user at the same time. Consequently, to read a complete line of text, the user is usually required to read a portion of the text that is currently displayed and then to pan the display of the data so that the remainder of the text is visible. As a result, a user is usually required to pan the displayed image back and forth while reading from the display screen.

It is possible to convert the image based data received by the portable communications device into ASCII code words so that the lines of text may be divided and simultaneously displayed to the user. In this regard, an optical character recognition (OCR) device may be used to scan the lines of text and to define ASCII code words through well known techniques. However, OCR techniques are not always accurate, and the conversion of the image based data into ASCII code words may increase the number of errors in the data. Furthermore, utilization of OCR devices in portable communications devices usually increases the size and the power of the portable communications devices to undesirable levels. Therefore, it is not always desirable to convert image based data into ASCII code words before displaying the data to the user in portable communications devices.

Thus, a heretofore unaddressed need exists in the industry for a system and method of efficiently rendering image based data via a portable communications device such that each word of a line of text is simultaneously visible.

SUMMARY OF THE INVENTION

The present invention overcomes the inadequacies and deficiencies of the prior art as discussed hereinbefore. Generally, the present invention provides a system and method for rendering image based data via a display screen such that each word of a row of text is simultaneously visible.

The present invention utilizes a data interface, a display device, and a data manager. The data interface receives image based data that is used by the display device to display an image. The data manager identifies word blocks defined by the received data. The data manager uses the word blocks to define a first row of the image. In this regard, the data manager determines whether images respectively defined by each of the word blocks would be visible if the word blocks are rendered to the first row of the display screen. In response to a determination that an image associated with one of the word blocks would not be visible if the one word block is rendered to the first row of the display screen, the data manager defines a second row and renders the one word block to the second row.

The present invention can also be viewed as providing a method for rendering image based data. Briefly described, the method can be broadly conceptualized by the following steps: receiving image based data; identifying word blocks defined by the image based data; rendering portions of the data defining at least one of the word blocks on a row of a display screen; selecting one of the word blocks; determining whether an image associated with the selected word block fits on the row of the display screen, and rendering a portion of the data defining the selected word block based on the determining step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1A:
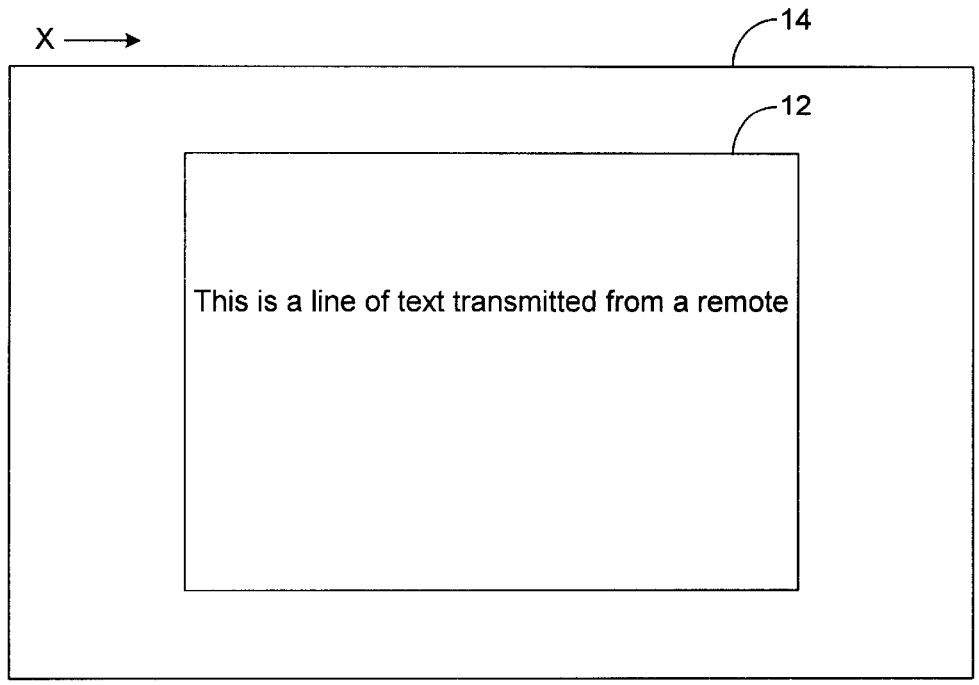
FIG. 1A is a diagram illustrating a conventional communications system displaying a portion of a line of text.
Figure 1B:
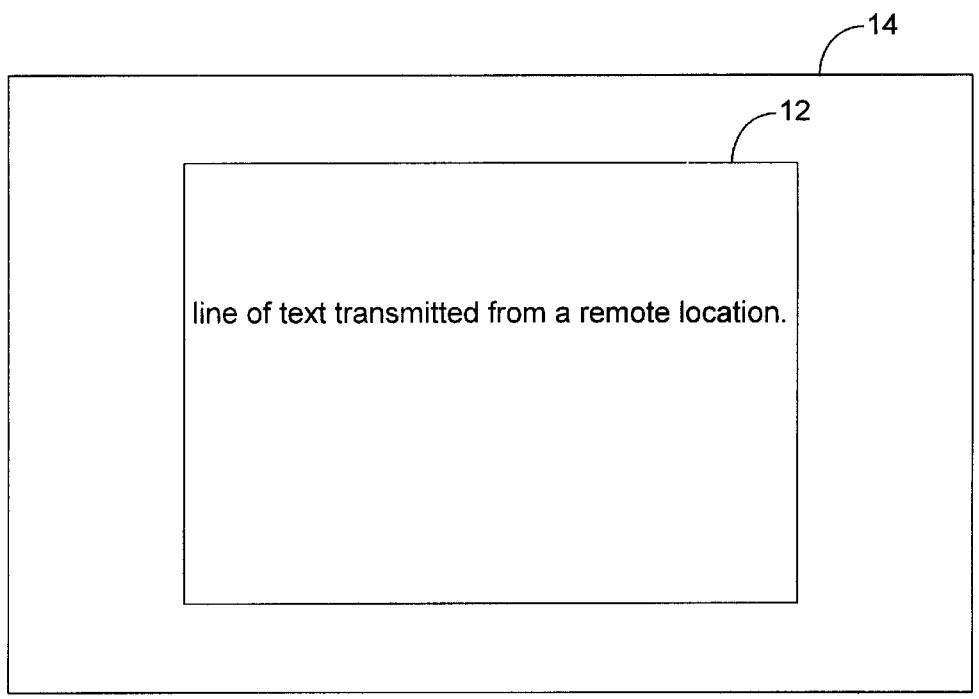
FIG. 1B is a diagram illustrating the communications system of FIG. 1A when the system displays the remaining portion of the line of text.

FIG. 1A shows an image produced by a display screen 12 of a conventional communications system 14. In this regard, the communications system 14 has received image based data defining a line of text. The complete line reads, "This is a line of text transmitted from a remote location." However, because the width (i.e., distance in the x-direction) of the display screen 12 is too small to display the complete line of text, only a portion of the line of text is visible. The user may pan the image to display the remainder of the words in the line, as shown by FIG. 1B. However, having to pan the image to read the remainder of the line is inconvenient and inefficient.

Figure 2:
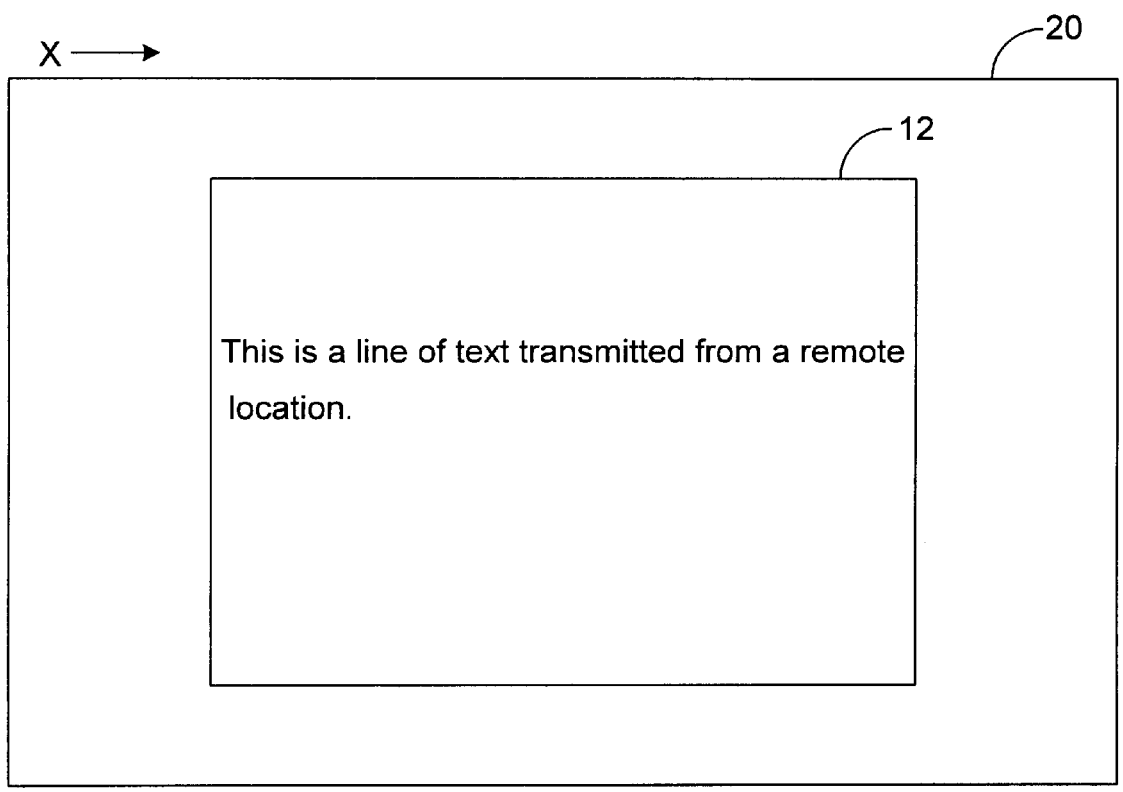
FIG. 2 is a diagram illustrating a communications system of the present invention displaying the line of text shown in FIGS. 1A and 1B.

The present invention enables the user to view each word in the line of text by utilizing multiple rows to display the line of text. As an example, FIG. 2 shows a communications system 20 in accordance with the present invention. As seen by FIG. 2, the line of text is displayed by two rows of the display screen 12 such that each word of the line of text is simultaneously visible to the user.

Figure 3:
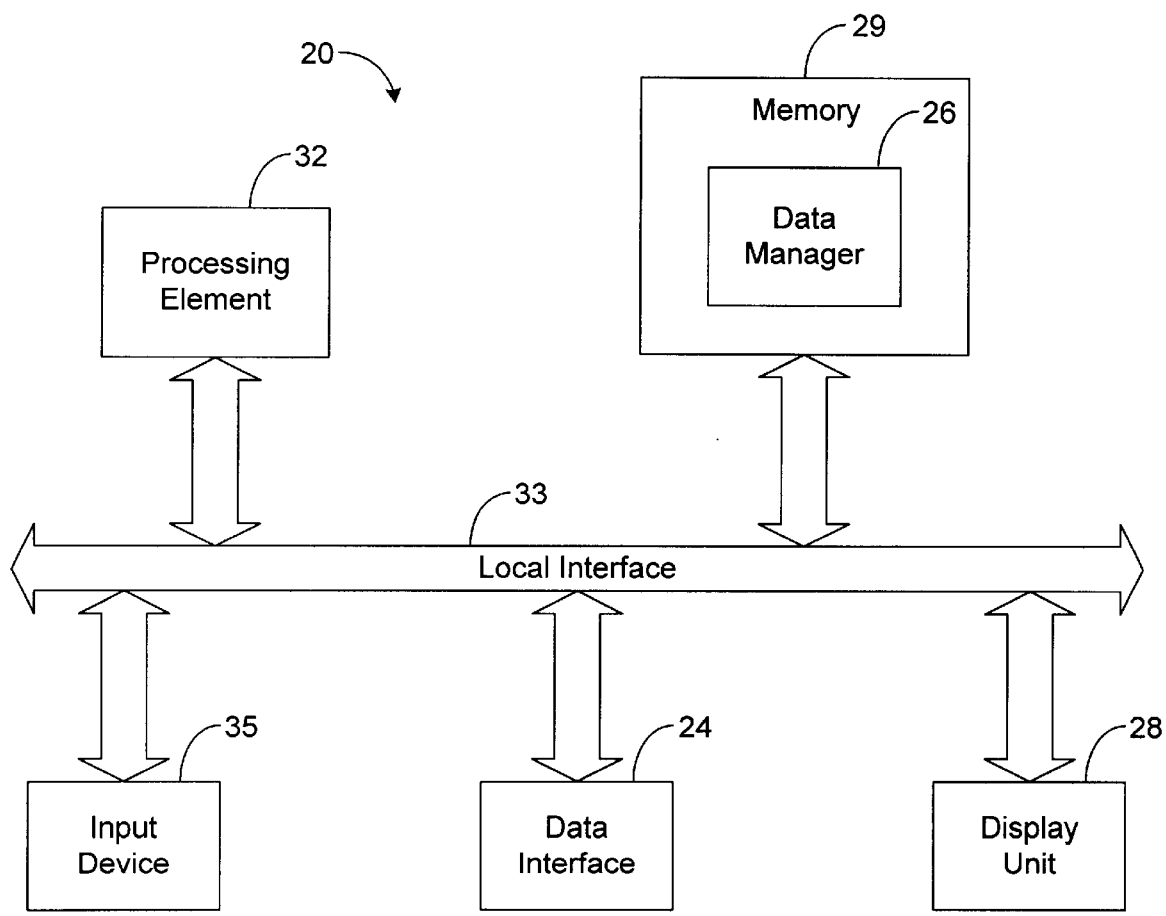
FIG. 3 is a block diagram illustrating the communications system of FIG. 2.

FIG. 3 shows a more detailed view of the communications system 20. In this regard, the communications system 20 includes a data interface 24, a data manager 26, and a display unit 28. The data interface 24 is configured to receive data that is to be displayed by the display unit 28. As an example, the data interface 24 may connect to a telephone connection or other type of medium that connects the data interface 24 with a remote network (not shown) or with a remote communications device (not shown), or the data interface 24 may be configured to receive data stored on a computer disk (not shown). The display unit 28 includes a display screen 12 (FIG. 2) that can be used via conventional techniques to display an image based on data received by the display unit 28.

The data manager 26 is configured to control the rendering of the data received from data interface 24. The data manager 26 can be implemented in software, hardware, or a combination thereof. In the preferred embodiment, as illustrated by way of example in FIG. 3, the data manager 26 of the present invention along with its associated methodology is implemented in software and stored in computer memory 29.

Note that the data manager 26, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the data manager 26 may be magnetically stored and transported on a conventional portable computer diskette.

In the preferred embodiment, one or more conventional processing elements 32, such as a digital signal processor (DSP), communicate to and drive the other elements within the system 20 via a local interface 33, which can include one or more buses. Furthermore, an input device 35, can be used to input data from the user of the system 20.

In the preferred embodiment, the data received by the data interface 24 is image based data. Therefore, the data received by data interface 24 defines an image by providing a value for each pixel associated with the display screen 12. The data manager 26 is preferably configured to divide the image into a plurality of cells and to determine which cells include text.

In this regard, conventional optical character recognition (OCR) techniques exist for dividing an image into a plurality of cells in the process of separating text from background. U.S. Pat. No. 5,237,627, entitled "Noise Tolerant Optical Character Recognition System," U.S. Pat. No. 5,280,367, entitled "Automatic Separation of Text from Background in Scanned Images of Complex Documents," and U.S. Pat. No. 5,179,599, entitled "Dynamic Thresholding System for Documents using Structural Information of the Documents," which are all incorporated herein by reference, describe systems that divide an image into a plurality of cells to separate text from background. In general, the image is first separated into a plurality of cells, and then each cell is analyzed to determine which portions of the cells include text and which portions only include background. Thereafter, the cells can be further analyzed to determine which characters are defined by the text so that the text can be defined by ASCII code words.

Figure 4:
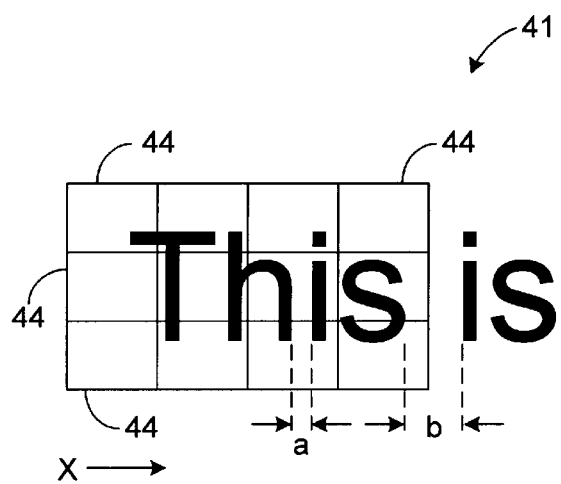
FIG. 4 is a diagram illustrating a word block.

The techniques described in the aforementioned patents for determining which portions of the cells include text are preferably used by the data manager 26 to determine which cells define a word block. A word block is a group of cells that include text defining a part of a particular word. As an example, FIG. 4 depicts a word block 41 associated with an image of the word "This." Word blocks 41 are separated from other word blocks 41 by a width (i.e., distance in the x-direction) of background that is relatively large compared to the widths of background that separate the characters of a word. Therefore, by analyzing the width of background space between text, the data manager 26 can identify word blocks 41. As an example, referring to FIG. 4, the distance "a" is much smaller than the distance "b." Therefore, based on the widths of "a" and "b," the data manager 26 can determine that the text defining the characters "h" and "i" (in the word "This") are associated with the same word whereas the text defining the characters "s" (in the word "This") and "i" (in the word "is") is associated with different words.

Therefore, the data manager 26 is designed to identify text that is separated from other text by at least a threshold width as the end of a word, and any text between two adjacent word ends is identified as a portion of a word. As an example, the text defining "T" and "s" (in the word "This") is identified as the ends of the same word by analyzing the width of background space, as described hereinabove. Since the text defining "h" and "i" (in the word "This") is between the text associated with the word ends, the text defining "h" and "i" (in the word "This") is also associated with the word block 41. Note that it is not necessary for the data manager 26 to actually determine the ASCII code for the characters that are included in the identified word. It is sufficient for the data manager 26 to identify which text (and, therefore, which portions of the image based data received by data interface 24) are associated with the word block 41.

The data manager 26 is designed to transmit the data defining each identified word block 41 to the display unit 28 such that the display screen 12 of the display unit 28 displays multiple rows of text. In this regard, the data manager 26 is configured to define the first row of the display screen 12 with an identified word block 41. In other words, the portions of the image based data defining the identified word block 41 are transmitted to the display unit 28. As an example, the data manager 26 may transmit to the display unit 28 each cell 44 that includes text associated with the first word block 41. The image produced by this word block 41 is positioned as the first word on the first row of the display screen 12.

The data manager 26 is then designed to render each consecutive word block 41 of the text in sequence on the same row of the display screen 12 until the data manager 26 determines that the row is complete. The row is complete when the next word block 41 would not be visible on the display screen 12 or, in other words, until the row extends further than a threshold width. The threshold width should be less than the width of the display screen 12.

When the data manager 26 determines that the row is complete, the data manager 26 is designed to render the next word block 41 (and any remaining word blocks 41) on the next row until the next row becomes complete. This process is repeated until all of the word blocks 41 have been rendered. Therefore, each word of each row displayed by the screen display 12 is visible to the user, and there is no need for the user to pan the image horizontally (i.e., in the x-direction).

It should be noted that other techniques for identifying the data associated with different words may be employed without dividing the image into cells 44. Any technique capable of identifying the words defined by the image based data is sufficient for implementing the present invention. It should be noted that a word is "identified" when the data and/or cells defining the word is distinguished from the data and/or cells defining the background or other words. It is not necessary for the characters of the word to be determined in order for the word to be "identified."

Operation

The preferred use and operation of the system 20 and associated methodology are described hereafter.

Figure 5:
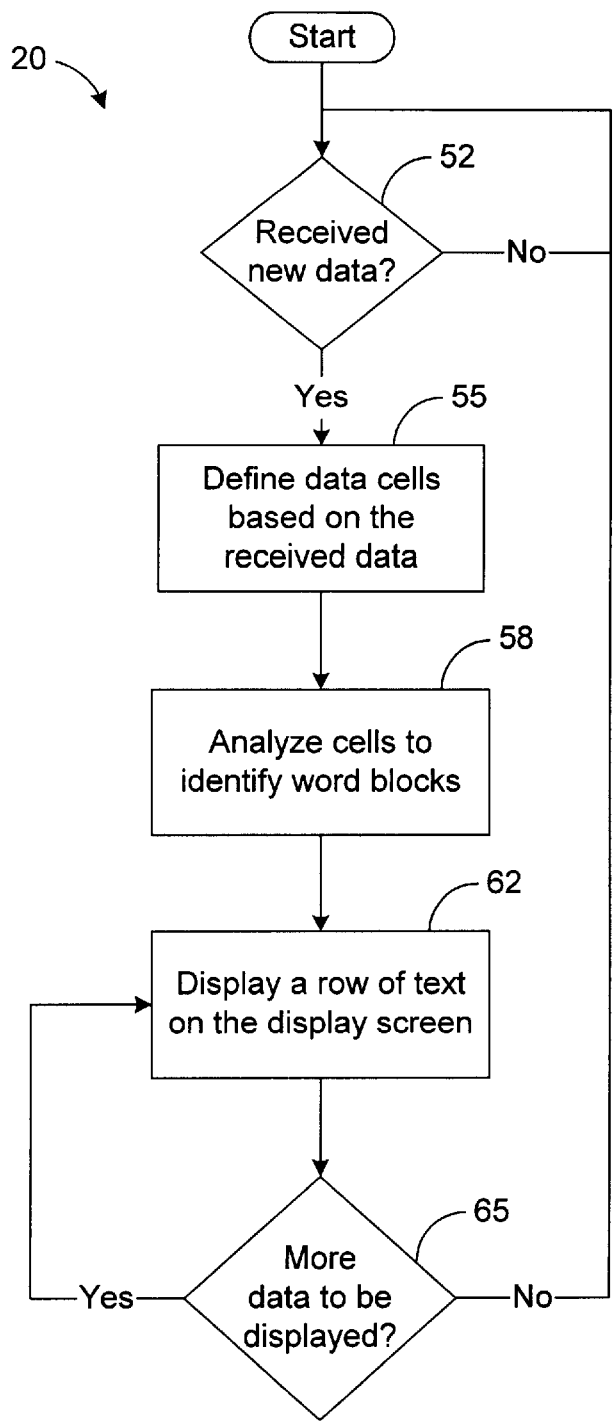
FIG. 5 is a flow chart illustrating the architecture and functionality of the communications system depicted by FIG. 3.

Initially, the communications system 20 receives image based data via data interface 24, as shown by block 52 of FIG. 5. The image based data defines an image having lines or rows of text, such as the row of text depicted by FIGS. 1A and 1B, for example. The data manager 26 defines data cells 44 based on the received data, as shown by block 55. Then the data manager 26 analyzes the cells 44 to identify word blocks 41, as depicted by block 58. A word block 41 is a group of cells 44 including text that is separated by less than a threshold width. Word blocks 41 can have various shapes and/or sizes, and the aforementioned threshold width preferably corresponds to the maximum width that may exist between characters of the same word.

Once the word blocks 41 are identified by the data manager 26, the data manager 26 defines multiple rows of text and displays these rows of text on the display screen 12, as shown by blocks 62 and 65. To display a row of text, the data manager 26 selects the first word block 41 that is to be displayed on the row of text. For example, assuming that the image data defines the phrase "This is a line of text transmitted from a remote location," the data manager selects the word block 41 defining the word "This." The data manager 26 transmits the data defining this first word block 41 to the display unit 28 to be rendered as the first word on the first row of the image produced by the screen display 12, as shown by block 67 of FIG. 6. If the first word block 41 is associated with a start of a paragraph, then the image of the first word block 41 should be indented.

Next, the data manager 26 selects the next word block 41 defined by the data (assuming that another word block 41 exists) and determines whether the next word block 41 fits on the same row of text, as shown by blocks 69 and 71. The next word block 41 fits on the row of text when the image of the next word block 41 can be simultaneously displayed on the same row of the screen display 12 along with the images of all of the other word blocks 41 already defining the row. In this regard, there is a maximum width that the rows of text displayed by the screen display 12 can be before the row becomes too long to be simultaneously displayed by the screen display 12 (i.e., before the width of the row of text exceeds the width of the screen display 12). Therefore, the data manager 26 can determine whether the next word block fits on the row of text by determining whether the width of the row exceeds this maximum width once the next word block 41 has been rendered to the row.

If the width of the row exceeds the maximum width after the next word block is added, then the next word block 41 does not fit on the row. Otherwise, the next word block 41 fits on the row and can be rendered or positioned next to the last word block 41 presently on the row, as shown by block 73. Note that it is desirable to ensure that a minimum separation width exists between the words defined by two adjacent word blocks so that the words can be identified by the user.

In the example described hereinabove, the next word block 41 defines the word "is" which is positioned next to the first word block 41 defining the word "This." After positioning the next word block 41 on the row of text displayed by the screen display 12, the data manager 26 determines whether the word block 41 just rendered defines the last word of a paragraph in block 75. If so, the data manager 26 proceeds to block 65 (FIG. 5). Otherwise, the data manager 26 returns to block 69 and determines in block 71 whether the next word block 41 (i.e., the word block 41 defining the word "a" in the foregoing example) fits on the row of text. The aforementioned process is repeated until there are no more word blocks 41 to display, until the next word block 41 will not fit on the row of text being defined by the data manager 26, or until the end of the paragraph is reached.

Figure 6:
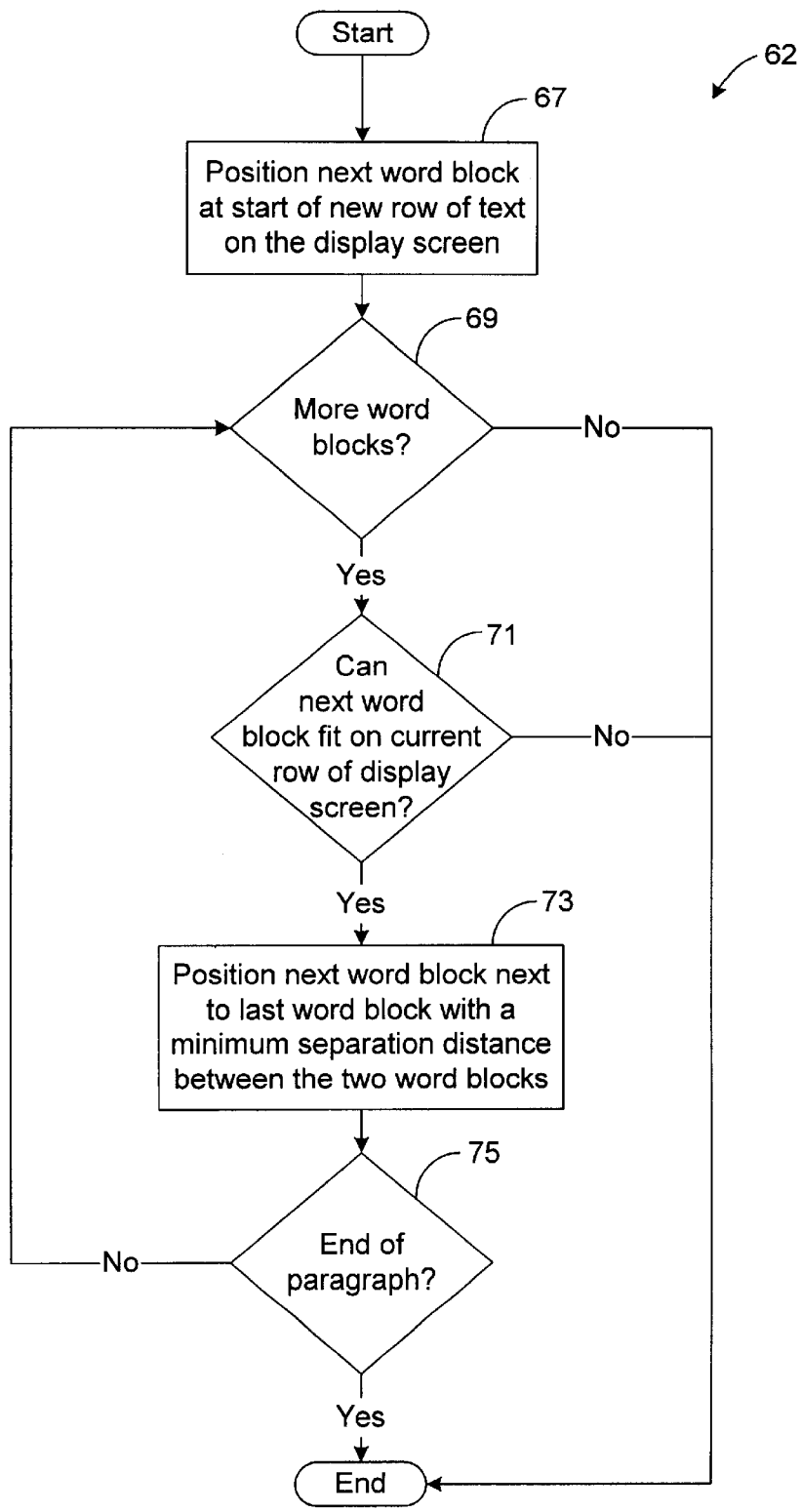
FIG. 6 is a flow chart illustrating a more detailed view of the flow chart of FIG. 5.

Once the data manager 26 determines in block 71 that the next word block 41 will not fit on the row of text or that the end of a paragraph is reached, a new row of the screen display 12 is defined. The next word block 41 is rendered as the first word on the new row of the display screen 12, as shown by blocks 62, 65 and 71 (FIGS. 5 and 6). Then, the process of selecting the next word block 41 and rendering the next word block 41 to the same row is repeated, as shown by blocks 69–75. In the example described hereinbefore, the end of the first row displayed by the display screen 12 is reached after the word blocks 41 defining the words "This is a line of text transmitted from a remote" have been rendered. Since the word "location" would not be simultaneously visible with the other words if positioned next to the word "remote" (i.e., since the word block 41 defining the word "remote" does not fit on the same row of the screen display 12), the data block 41 defining the word "location" is rendered as the first word of a new row. Therefore, the word "location" is displayed on the new row of the display screen, as shown by FIG. 2.

The process depicted by FIGS. 5 and 6 is continued until each word block 41 of the data has been rendered. Since none of the rows of text produced by the aforementioned process are wider than the display screen 12, each word of each row is visible to the user when the row is being displayed by the display screen 12. Consequently, the user does not need to horizontally pan the image of the display screen 12 in order to read each word of any row.

It should be noted that the data manager 26 preferably detects the beginning of a paragraph (and, therefore, the end of the preceding paragraph) by analyzing the image based data received at block 52. In this regard, the beginning of a paragraph is normally indented, or the distance between the text of paragraphs is normally greater than the distance between the textual lines of a paragraph. Therefore, the data manager 26 can detect the beginning or ending of a paragraph by analyzing the width of blank space preceding a line of text or by analyzing the distance between the lines of text defined by the image based data.

In this regard, if the blank space preceding a line of text exceeds a threshold value, then the data manager 26 determines that the line of text is the first line of a paragraph. Furthermore, if the blank space separating a line of text from an adjacent line of text exceeds another threshold value, then the data manager 26 determines that the line of text is either the first line or the last line of a paragraph depending on whether the line of text precedes or follows the adjacent line of text. Once the first and last lines of each paragraph have been determined, the data manager 26 can identify the first and last word blocks 41 in each paragraph. In this regard, the first word block 41 of a paragraph is the first word block 41 on the first line of a paragraph, and the last word block 41 of a paragraph is the last word block 41 on the last line of the paragraph. Consequently, by analyzing the image based data received at block 52, the data manager 26 in block 75 can determine when the end of a paragraph has been reached.

Although the example described hereinabove utilizes the single exemplary line of text shown by FIGS. 1A and 1B, it should be apparent to one skilled in the art that the methodology described herein enables a plurality of lines to be rendered according to the principles of the present invention. Therefore, multiple lines of text (including multiple paragraphs) defined by image based data can be word wrapped by the system 20 via the techniques described hereinabove.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A communication system for rendering image based data, comprising:

a data interface configured to receive remotely generated data, said data including information responsive to an image of text;

a display device configured to display an image; and a data manager configured to translate the remotely generated data to identify word blocks defined by said data by measuring and analyzing distances between text defined by said data, to render a plurality of said word blocks on a first row of said image, to determine whether an image defined by one of said word blocks would be visible if said one word block is rendered on said first row, to render said one word block on a second row of said image in response to a determination that said image defined by said one word block would not be visible if said one word block were rendered on said first row, wherein said data manager, in rendering said word blocks, is configured to interface textual and non-textual data of said word blocks with said display device, said non-textual data including a plurality of said pixel values that define a background of said word blocks, said display device configured to color background pixels of said image based on said plurality of pixel values of said non-textual data.

2. The system of claim 1, wherein said data manager is configured to compare said distances to a threshold value in order to identify said word blocks.

3. The system of claim 1, wherein said image based data is included within a facsimile message received by said data interface.

4. The system of claim 1, wherein said image based data defines an image of a document and each of said word blocks defines a word within a single row of said document.

5. The system of claim 4, wherein said image based data is included within a facsimile message received by said data interface.

6. A method for rendering image based data, comprising the steps of:

receiving remotely generated data, said data including information responsive to an image of text;

analyzing distances between text defined by said data;

identifying word blocks defined by said image based data based on said analyzing step;

rendering at least one of said word blocks on a row of a display screen;

selecting one of said word blocks;

determining whether an image associated with said selected word block fits on said row of said display screen; and rendering textual and non-textual data of said selected word block based on said determining step, said non-textual data including a plurality of said pixel values that define a background of said selected word block.

7. The method of claim 6, wherein said rendering step includes the step of rendering said data of said selected word block on said row in response to a determination in said determining step that said image associated with said selected word block fits on said row.

8. The method of claim 6, wherein said rendering step includes the step of rendering said data of said selected word block on another row of said display screen in response to a determination in said determining step that said image of said selected word block does not fit on said row.

9. The method of claim 6, further comprising the steps of:

analyzing said image based data to determine whether said selected word block defines an end of a paragraph;

selecting another one of said word blocks; and rendering said other one of said word blocks on another row of said display screen based on a determination in said analyzing said image based data step that said selected word block defines said end of said paragraph.

10. The method of claim 6, wherein said analyzing step further includes the step of comparing said distances to a threshold value.

11. The method of claim 6, wherein said image based data, in said receiving step, is received from a facsimile message.

12. The method of claim 6, further comprising the steps of:

providing a display device; and displaying an image at said display device based on said word blocks, wherein said rendering textual and non-textual data step includes the step of transmitting said textual and non-textual data to said display device.

13. A method for rendering image based data, comprising the steps of:

providing a display device having a display screen;

receiving remotely generated data, said data including information responsive to a graphical image of text;

separating said image into a plurality of cells;

analyzing distances between text of said image;

grouping said cells into word blocks based on said analyzing step;

displaying an image of one of said word blocks on a first row of said display screen;

determining whether an image of another of said word blocks would be visible if said other word block is rendered on said first row; and displaying an image of said other word block on a second row of said display screen based on said determining step.

14. The method of claim 13, wherein said analyzing step further includes the step of comparing said distances to a threshold value.

15. The method of claim 13, wherein said image based data, in said receiving step, is received from a facsimile message.

16. The method of claim 13, further comprising the step of defining a single row of a document with each of said word blocks.

17. The method of claim 16, wherein said image based data, in said receiving step, is received from a facsimile message.

18. The method of claim 13, further comprising the steps of:

transmitting each portion of said data defining said cells of said one word block to said display device; and transmitting each portion of said data defining said cells of said other word block to said display device.

* * * * *